US010962727B2

(12) United States Patent
Zhang et al.

(10) Patent No.: US 10,962,727 B2
(45) Date of Patent: Mar. 30, 2021

(54) OPTICAL FIBER HEAT EXCHANGER HAVING PARALLEL CHANNELS FOR OPTICAL FIBER COOLING

(71) Applicant: Lumentum Operations LLC, Milpitas, CA (US)

(72) Inventors: Yiduo Zhang, Cupertino, CA (US); Gilberto Madrid, Los Altos, CA (US); Titus Whitehead, Sunnyvale, CA (US); Martin H. Muendel, Oakland, CA (US)

(73) Assignee: Lumentum Operations LLC, San Jose, CA (US)

( * ) Notice: Subject to any disclaimer, the term of this patent is extended or adjusted under 35 U.S.C. 154(b) by 0 days.

(21) Appl. No.: 16/688,702

(22) Filed: Nov. 19, 2019

(65) Prior Publication Data

US 2020/0326493 A1    Oct. 15, 2020

Related U.S. Application Data

(60) Provisional application No. 62/832,021, filed on Apr. 10, 2019.

(51) Int. Cl.
*G02B 6/42* (2006.01)
*G02B 6/38* (2006.01)

(52) U.S. Cl.
CPC ......... *G02B 6/4268* (2013.01); *G02B 6/3814* (2013.01)

(58) Field of Classification Search
CPC ...... G02B 6/4268; G02B 6/3814; G02B 6/05; G02B 6/06
See application file for complete search history.

(56) References Cited

U.S. PATENT DOCUMENTS

| | | | | |
|---|---|---|---|---|
| 3,666,949 A | * | 5/1972 | De Falco | G02B 6/4202 250/338.1 |
| 4,519,390 A | * | 5/1985 | Horne | A61B 18/24 606/15 |
| 4,730,885 A | * | 3/1988 | Doi | G02B 6/3814 385/75 |
| 5,151,962 A | * | 9/1992 | Walker | G02B 6/3604 385/136 |
| 5,263,108 A | * | 11/1993 | Kurokawa | G02B 6/42 385/89 |
| 5,380,318 A | * | 1/1995 | Daikuzono | A61B 18/22 606/16 |
| 5,415,655 A | * | 5/1995 | Fuller | G02B 6/3814 606/16 |

(Continued)

*Primary Examiner* — Andrew Jordan
(74) *Attorney, Agent, or Firm* — Harrity & Harrity, LLP

(57) ABSTRACT

An optical fiber heat exchanger includes an outer body and an inner body inserted into the outer body. The inner body includes a plurality of guide walls to guide a cooling liquid through the optical fiber heat exchanger to exchange heat from an optical fiber inserted in the optical fiber heat exchanger, a first set of parallel straight channels, extending along an inlet portion of the inner body, formed by a first subset of the plurality of guide walls, a set of U-shaped channels, extending through a transition section of the inner body, formed by a second subset of the plurality of guide walls, and a second set of parallel straight channels, extending along an outlet portion of the inner body, formed by a third subset of the plurality of guide walls.

20 Claims, 4 Drawing Sheets

(56) References Cited

U.S. PATENT DOCUMENTS

| | | | | |
|---|---|---|---|---|
| 5,548,674 A * | 8/1996 | Rondeau | | G02B 6/3624 |
| | | | | 385/72 |
| 5,717,712 A * | 2/1998 | Swaminathan | | H04B 10/503 |
| | | | | 372/107 |
| 5,827,267 A * | 10/1998 | Savage | | G02B 6/3814 |
| | | | | 606/16 |
| 5,929,518 A * | 7/1999 | Schlaiss | | G02B 6/4214 |
| | | | | 257/415 |
| 6,039,728 A * | 3/2000 | Berlien | | A61N 5/0601 |
| | | | | 606/15 |
| 6,078,714 A * | 6/2000 | Cavanaugh | | G02B 6/4296 |
| | | | | 385/115 |
| 6,167,177 A * | 12/2000 | Sandstrom | | G02B 6/14 |
| | | | | 385/100 |
| 6,260,614 B1 * | 7/2001 | Guy | | G02B 6/06 |
| | | | | 165/185 |
| 6,270,262 B1 * | 8/2001 | Hudgins | | G02B 6/43 |
| | | | | 361/699 |
| 6,440,158 B1 * | 8/2002 | Saab | | A61F 7/123 |
| | | | | 607/105 |
| 6,905,510 B2 * | 6/2005 | Saab | | A61F 7/123 |
| | | | | 606/21 |
| 7,745,898 B2 * | 6/2010 | Campbell | | G02B 6/4268 |
| | | | | 257/433 |
| 8,501,060 B2 * | 8/2013 | Johnson | | B29C 35/007 |
| | | | | 264/40.6 |
| 8,945,106 B2 * | 2/2015 | Arless | | A61B 18/02 |
| | | | | 606/21 |
| 8,983,256 B2 * | 3/2015 | Konishi | | G02B 6/4401 |
| | | | | 385/109 |
| 9,011,421 B2 * | 4/2015 | Brannan | | A61B 18/1815 |
| | | | | 606/33 |
| 9,052,467 B2 * | 6/2015 | Roos | | G02B 6/3813 |
| 9,279,949 B2 * | 3/2016 | Johnson | | G02B 6/4268 |
| 9,360,643 B2 * | 6/2016 | Rinzler | | G02B 6/3813 |
| 9,632,261 B1 * | 4/2017 | Zortman | | G02B 6/4204 |
| 9,638,877 B2 * | 5/2017 | Blomster | | G02B 6/3814 |
| 9,770,294 B2 * | 9/2017 | Brannan | | A61B 18/1815 |
| 9,937,003 B2 * | 4/2018 | Brannan | | A61B 18/1815 |
| 10,012,810 B2 | 7/2018 | Sanders | | |
| 10,042,123 B2 * | 8/2018 | Rinzler | | G02B 6/3818 |
| 10,067,304 B2 * | 9/2018 | Yu | | G02B 6/4251 |
| 10,261,274 B2 * | 4/2019 | Izumi | | H01S 3/0071 |
| 10,401,580 B2 * | 9/2019 | Yu | | G02B 6/241 |
| 10,481,339 B2 * | 11/2019 | Lee | | G02B 6/3818 |
| 10,634,852 B1 * | 4/2020 | Hsia | | G02B 6/3624 |
| 10,672,537 B2 * | 6/2020 | Goergen | | G02B 6/4416 |
| 10,732,357 B2 * | 8/2020 | Hoener | | G02B 6/3813 |
| 10,775,575 B1 * | 9/2020 | Hsia | | G02B 6/4296 |
| 2005/0113893 A1 * | 5/2005 | Saab | | A61F 7/123 |
| | | | | 607/105 |
| 2008/0161890 A1 * | 7/2008 | Lafontaine | | A61B 18/1492 |
| | | | | 607/105 |
| 2009/0161709 A1 * | 6/2009 | Campbell | | G02B 6/4201 |
| | | | | 372/35 |
| 2009/0310917 A1 * | 12/2009 | Roos | | G02B 6/3813 |
| | | | | 385/70 |
| 2013/0011102 A1 * | 1/2013 | Rinzler | | G02B 6/3813 |
| | | | | 385/89 |
| 2014/0050448 A1 * | 2/2014 | Konishi | | G02B 6/4436 |
| | | | | 385/100 |
| 2015/0300745 A1 * | 10/2015 | Kolb | | F28F 13/12 |
| | | | | 165/156 |
| 2015/0309275 A1 * | 10/2015 | Johnson | | G02B 6/3814 |
| | | | | 385/136 |
| 2016/0259140 A1 * | 9/2016 | Blomster | | G02B 6/036 |
| 2016/0341906 A1 * | 11/2016 | Rinzler | | G02B 6/3813 |
| 2017/0139164 A1 * | 5/2017 | Izumi | | G02B 6/4296 |
| 2017/0329092 A1 * | 11/2017 | Sanders | | G02B 6/3813 |
| 2018/0045895 A1 * | 2/2018 | Lee | | G02B 6/3814 |
| 2018/0172931 A1 * | 6/2018 | Yu | | G02B 6/241 |
| 2018/0341074 A1 * | 11/2018 | Yu | | G02B 6/241 |
| 2019/0304630 A1 * | 10/2019 | Goergen | | H04L 12/40045 |
| 2020/0326493 A1 * | 10/2020 | Zhang | | G02B 6/4268 |

* cited by examiner

OPTICAL FIBER HEAT EXCHANGER HAVING PARALLEL CHANNELS FOR OPTICAL FIBER COOLING

RELATED APPLICATION(S)

This application claims priority to U.S. Provisional Application No. 62/832,021, filed on Apr. 10, 2019, and entitled "PARALLEL CHANNELS FOR FIBER CONNECTOR COOLING," the content of which is incorporated by reference herein in its entirety.

TECHNICAL FIELD

The present disclosure relates to optical fiber heat exchangers and, more particularly, to heat exchangers including parallel straight channels for optical fiber cooling.

BACKGROUND

An optical fiber or optical fiber cable may be inserted into an optical fiber heat exchanger to permit the optical fiber cable to be temporarily and/or removably connected with other fibers and/or fiber cables, with test equipment, with power sources, with optical devices, and/or the like.

SUMMARY

According to some implementations, an optical fiber heat exchanger includes an outer body and an inner body inserted into the outer body. The inner body may include a plurality of guide walls to guide a cooling liquid through the optical fiber heat exchanger to exchange heat from an optical fiber inserted in the optical fiber heat exchanger. The inner body may include an inlet portion including a first set of parallel straight channels, formed by a first subset of the plurality of guide walls, that extend through the inlet portion. The inner body may include a transition section including a set of U-shaped channels, formed by a second subset of the plurality of guide walls, that extend through the transition section. The inner body may include an outlet portion including a second set of parallel straight channels, formed by a third subset of the plurality of guide walls, that extend through the outlet portion.

According to some implementations, an optical fiber heat exchanger includes an outer body and an inner body. The inner body includes a plurality of guide walls that form a plurality of parallel straight channels, extending along a length of the inner body, to guide a cooling liquid through the optical fiber heat exchanger to exchange heat from an optical fiber inserted in the optical fiber heat exchanger, wherein the plurality of parallel channels are parallel to the length of the inner body. The inner body includes a transition section comprising a plurality of U-shaped channels to guide the cooling liquid through the transition section, wherein the plurality of U-shaped channels connect a first subset of the plurality of parallel straight channels and a second subset of the plurality of parallel straight channels.

According to some implementations, an optical fiber heat exchanger includes an outer body and an inner body inserted into the outer body. The inner body includes a plurality of guide walls. The inner body includes a plurality of parallel straight channels, between the plurality of guide walls and extending parallel to a length of the inner body to guide a cooling liquid along the length of the inner body to exchange heat from an optical fiber inserted in the optical fiber heat exchanger. The inner body includes a transition section comprising a plurality of U-shaped channels to guide the cooling liquid through the transition section, wherein the plurality of U-shaped channels connect a first subset of the plurality of parallel straight channels and a second subset of the plurality of parallel straight channels.

DETAILED DESCRIPTION

Figure 1:
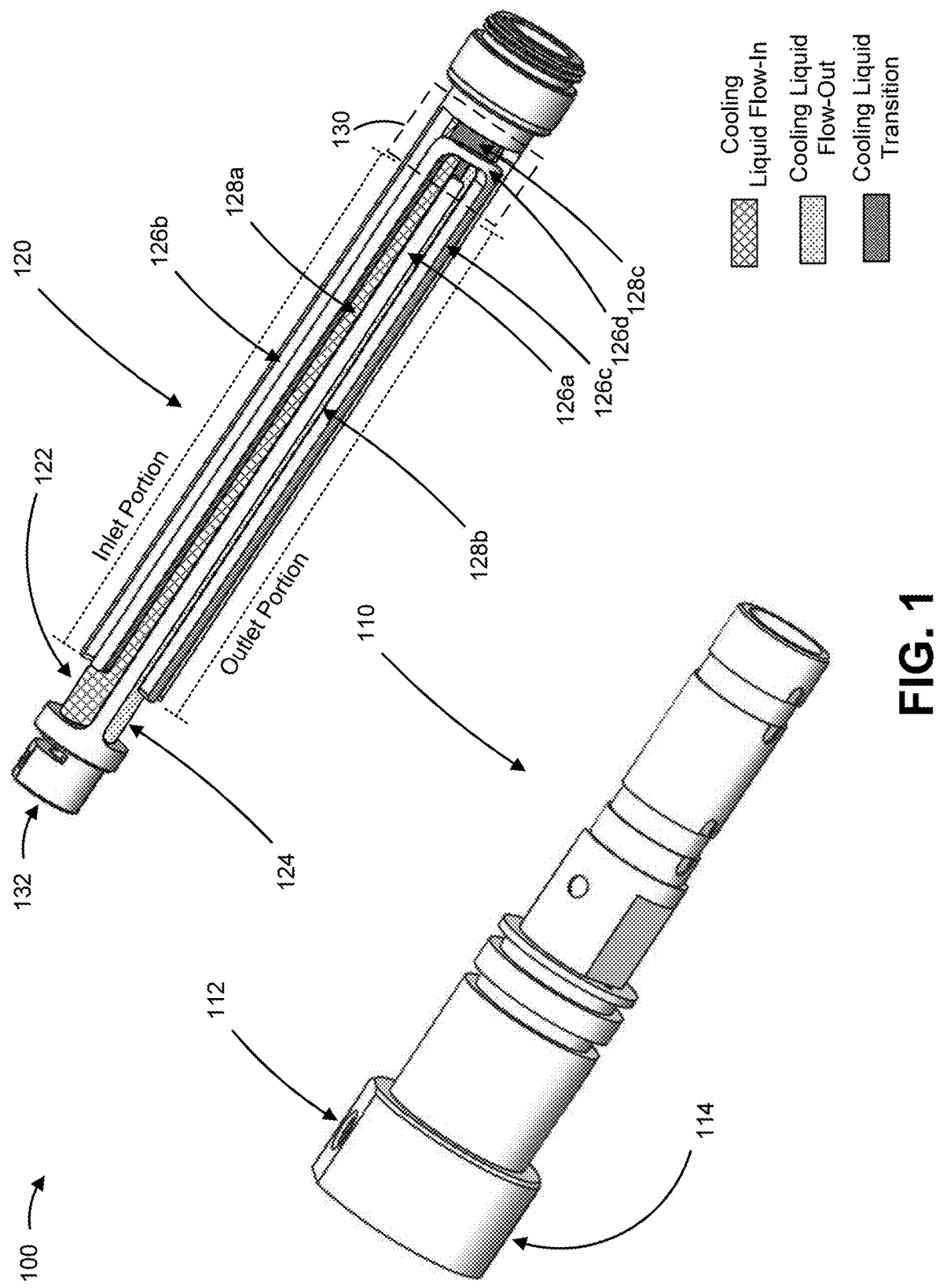
FIG. 1 illustrates a perspective exploded view of an optical fiber heat exchanger.

The following detailed description of example implementations refers to the accompanying drawings. The same reference numbers in different drawings may identify the same or similar elements.

An optical fiber heat exchanger may be used with an optical device, such as a laser (e.g., a kilowatt laser), that generates a large amount of heat. If the heat generated by the optical device is not adequately dissipated during operation of the optical device, prolonged exposure to large amounts of heat may cause the performance of the optical device and/or optical fiber to degrade, the optical device and/or optical fiber may become damaged, and/or the like.

Some implementations described herein provide various examples of optical fiber heat exchangers that provide cooling for optical fibers (and associated optical devices) inserted into the optical fiber heat exchangers. In some implementations, an optical fiber heat exchanger may include a plurality of guide walls that form a plurality of parallel straight channels extending along a length of the optical fiber heat exchanger.

In some implementations, the plurality of parallel straight channels may include one or more inlet parallel straight channels in an inlet portion along a first side of the optical fiber heat exchanger and one or more outlet parallel straight channels in an outlet portion along a second side of the optical fiber heat exchanger. The inlet parallel straight channels may carry a cooling liquid from an inlet section of the optical fiber heat exchanger, through the inlet portion, and to a transition section included in the optical fiber heat exchanger. The outlet straight parallel channels may carry the cooling liquid from the transition section, through the outlet portion, and to an outlet section of the optical fiber heat exchanger. Each of the plurality of parallel straight channels may be isolated from the other parallel straight channels throughout the length of the optical fiber heat exchanger, which reduces the pressure drop between the inlet parallel straight channels and the outlet parallel straight channels.

The cooling liquid may flow along the optical fiber heat exchanger from the inlet section, through the inlet parallel straight channels in the inlet portion to the transition section, through the transition section, and from the transition section to the outlet section through the outlet parallel straight channels in the outlet portion. As the cooling liquid flows through the optical fiber heat exchanger, heat is exchanged from an optical fiber inserted through the optical fiber heat exchanger to the cooling liquid, thereby cooling the optical fiber. The heated cooling liquid is carried out of the optical fiber heat exchanger via the outlet section.

The transition section may include a plurality of U-shaped channels connecting the inlet parallel straight channels and the outlet parallel straight channels. In this case, the inlet portion may be on a first side of the optical fiber heat exchanger, the outlet portion may be on a second side of the optical fiber heat exchanger opposing the first side, and the transition section may provide a transition between the inlet portion and the outlet portion. The U-shaped channels guide the cooling liquid through the transition section in a manner that prevents or reduces mixing of cooling liquid flow-in through the inlet parallel straight channels and cooling liquid follow-out through the outlet parallel straight channels, which increases the cooling efficiency and efficacy of the cooling liquid.

Figure 2:
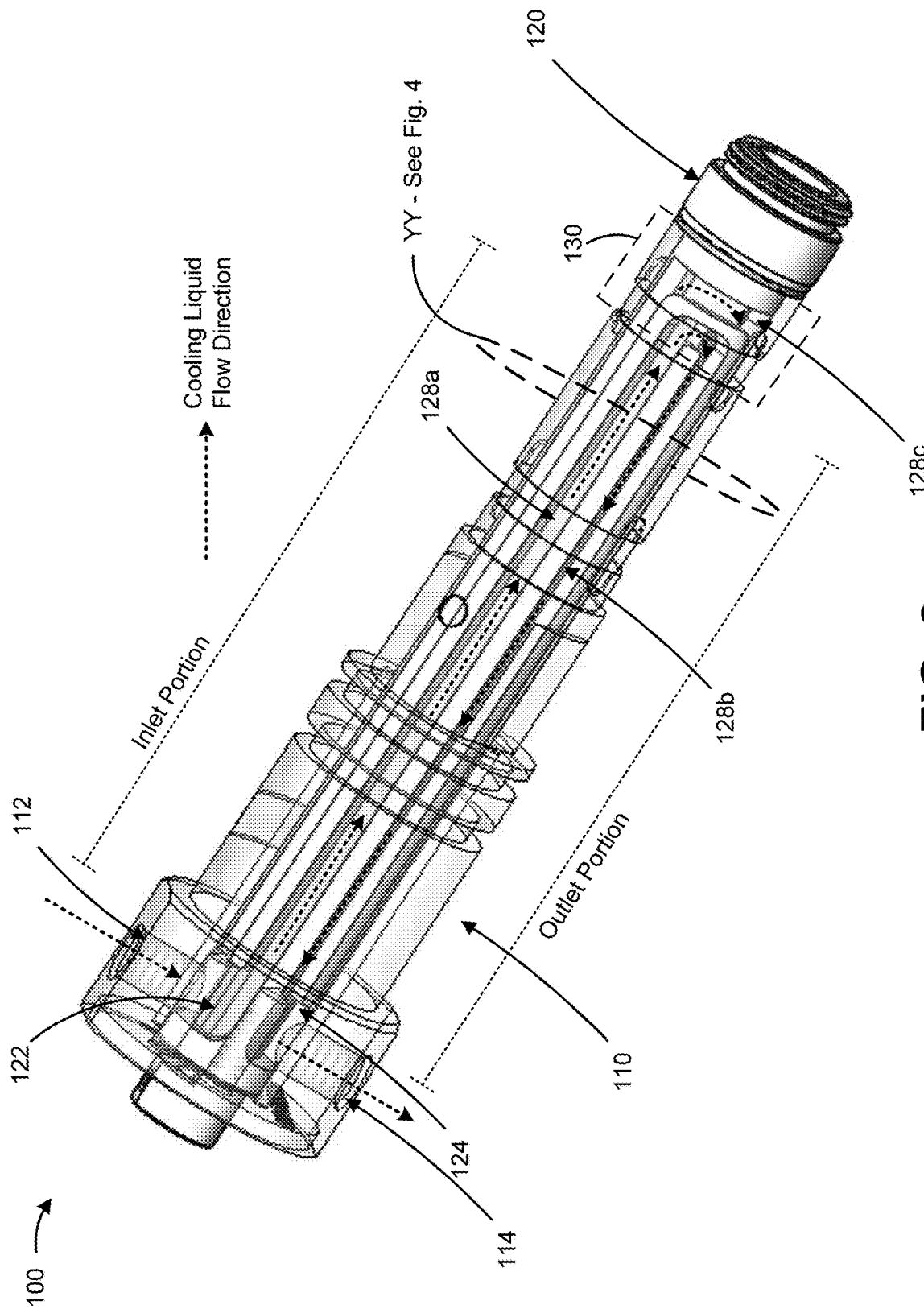
FIG. 2 illustrates a perspective assembled view of the optical fiber heat exchanger illustrated in FIG. 1.
Figure 3:
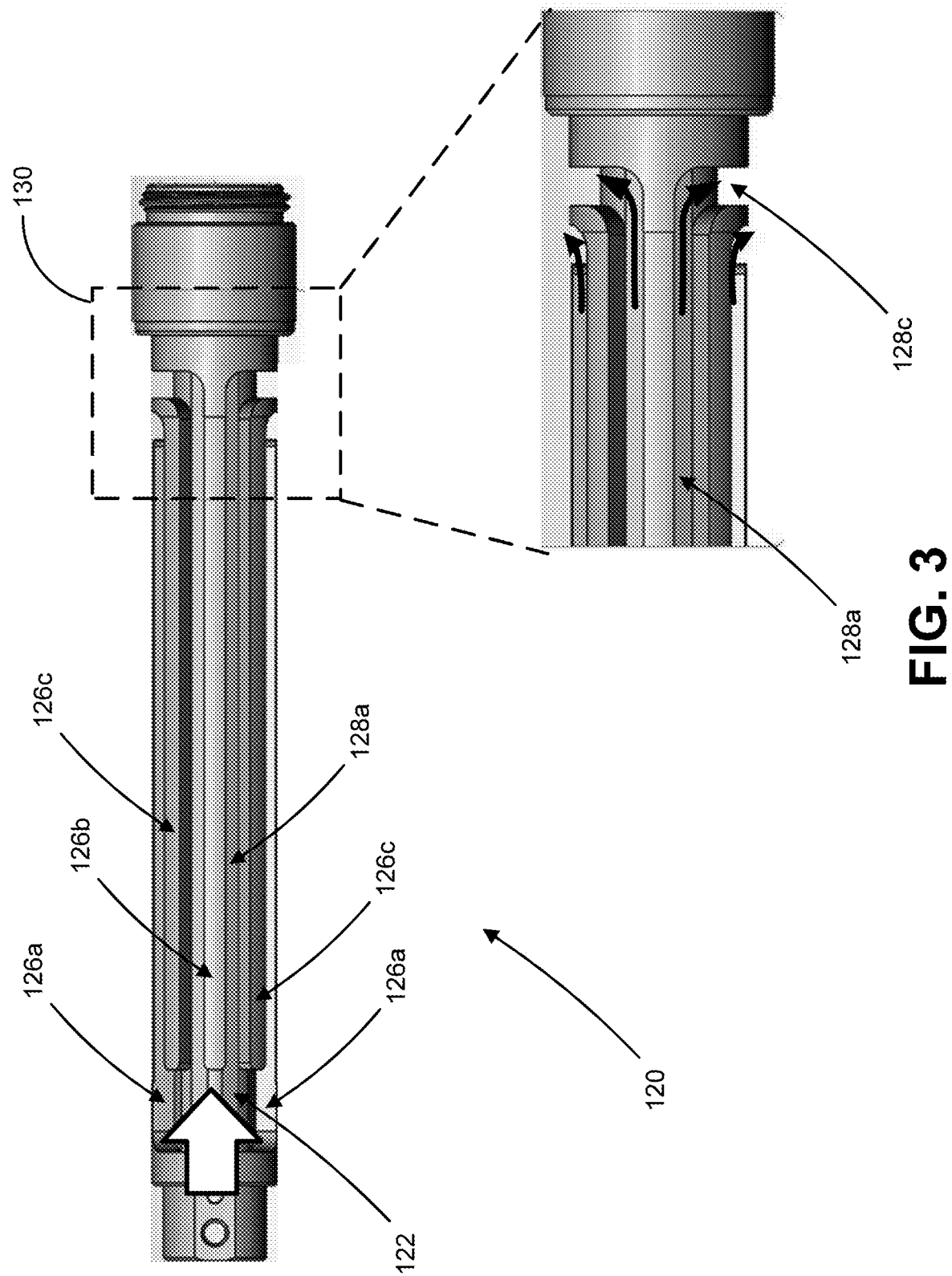
FIG. 3 illustrates a top-down view of an inner body of the optical fiber heat exchanger illustrated in FIG. 1.
Figure 4:
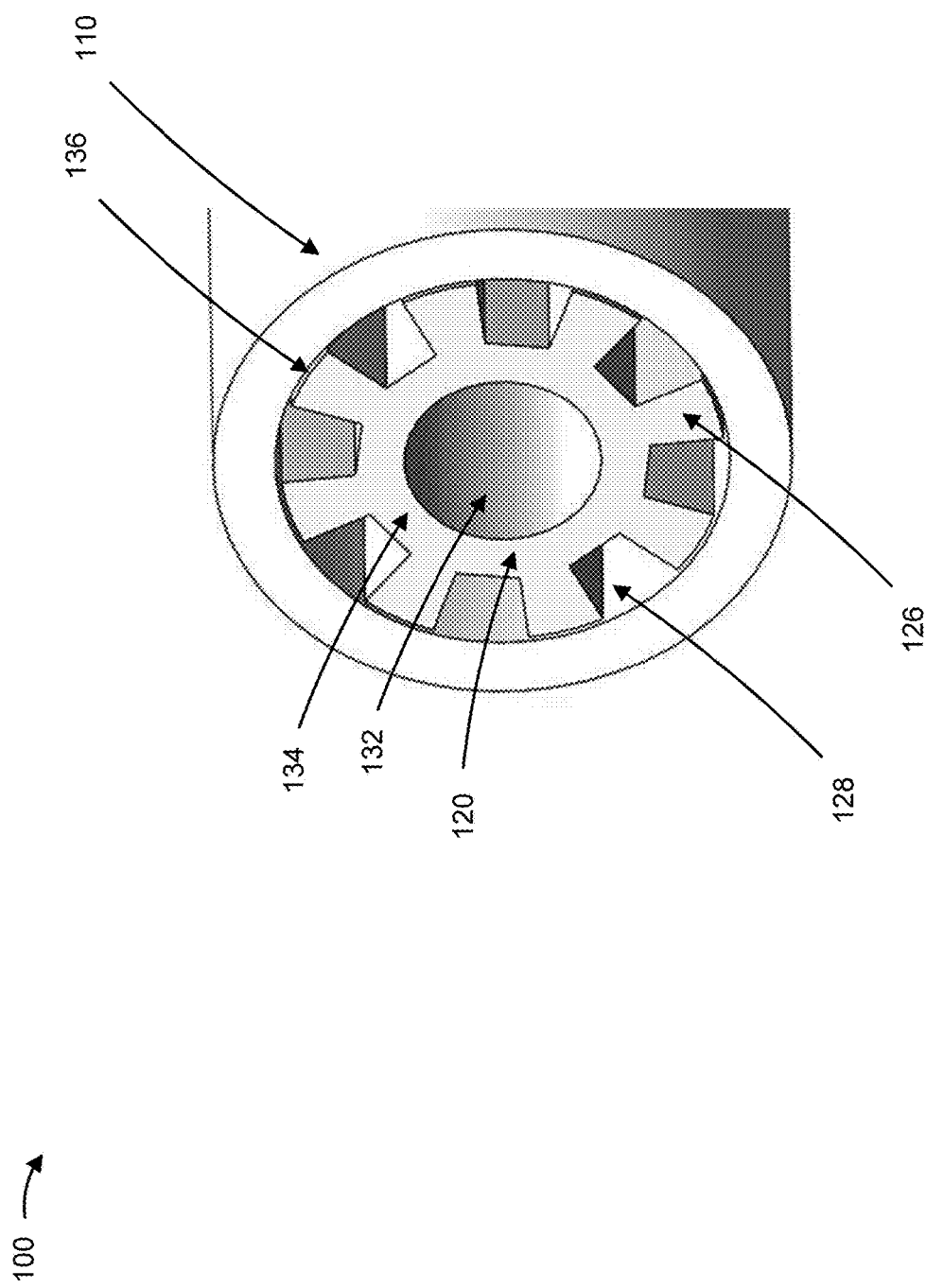
FIG. 4 illustrates a cross-sectional view of the optical fiber heat exchanger illustrated in FIG. 1.

FIG. 1 illustrates a perspective exploded view of an example optical fiber heat exchanger 100. FIG. 2 illustrates a perspective assembled view of optical fiber heat exchanger 100. FIG. 3 illustrates a top-down view of an inner body 120 of optical fiber heat exchanger 100. FIG. 4 illustrates a cross-sectional view of optical fiber heat exchanger 100 along plane YY in FIG. 2. In some implementations, optical fiber heat exchanger 100 may be referred to as an optical fiber feedthrough, an optical fiber connector, an optical fiber cooler, an optical fiber heat exchanger device, and/or other types of optical fiber devices that permit optical fibers and/or optical fiber cables to be cooled.

As shown in FIG. 1, optical fiber heat exchanger 100 may include an outer body 110 and an inner body 120. Outer body 110 may be a housing, a package, a cover, and/or another structure that houses inner body 120. In some implementations, outer body 110 and inner body 120 may each be capable of maintaining a flow of a cooling liquid at an inlet temperature of 25 degrees Celsius without hindering the flow of cooling liquid through optical fiber heat exchanger 100. In some implementations, outer body 110 and inner body 120 may be capable of withstanding a pressure buildup of up to 1 bar without hindering the flow of cooling liquid through optical fiber heat exchanger 100. In some implementations, outer body 110 and inner body 120 may be capable of withstanding a directly applied thermal load (e.g., from an optical fiber, an optical cable, and/or the like) without hindering flow of cooling liquid through optical fiber heat exchanger 100.

As further shown in FIG. 1, outer body 110 may include an inlet port 112 and an outlet port 114. Inlet port 112 may be an opening, a port, an aperture, and/or the like that functions as a point of ingress for cooling liquid into optical fiber heat exchanger 100. Inlet port 112 may be connected to a tube, a pipe, and/or another structure that supplies cooling liquid to optical fiber heat exchanger 100. Outlet port 114 may be an opening, a port, an aperture, and/or the like that functions as a point of egress for cooling liquid out of optical fiber heat exchanger 100. Outlet port 114 may be connected to a tube, a pipe, and/or another structure that carries cooling liquid away from optical fiber heat exchanger 100. The cooling liquid that flows through outlet port 114 may be cooling liquid carrying heat that is exchanged and/or removed from an optical fiber or optical cable inserted (e.g., partially or fully inserted) though optical fiber heat exchanger 100.

Inlet port 112 and outlet port 114 may be located at a same end of outer body 110. In some implementations, inlet port 112 and outlet port 114 may be located on different sides of outer body 110. For example, inlet port 112 and outlet port 114 may be located on opposing sides of outer body 110. As another example, inlet port 112 and outlet port 114 may be located on adjacent sides of outer body 110.

As further shown in FIG. 1, inner body 120 may include an inlet section 122 and an outlet section 124. Inlet section 122 may receive cooling liquid supplied through inlet port 112. Outlet section 124 may supply, to outlet port 114, cooling liquid carrying heat that is exchanged and/or removed from an optical fiber or optical cable inserted though aperture 132 in inner body 120. Aperture 132 may provide a sleeve, a chamber, and/or the like that extends through the length of inner body 120 in which the optical fiber or optical cable may be inserted.

Inlet section 122 and outlet section 124 may be located at a same end of inner body 120. In some implementations, inlet section 122 and outlet section 124 may be located on different sides of inner body 120 (e.g., an inlet side and an outlet side). For example, inlet section 122 and outlet section 124 may be located on opposing sides of inner body 120 (e.g., an inlet side and an opposing outlet side). As another example, inlet section 122 and outlet section 124 may be located on adjacent sides of inner body 120 (e.g., an inlet side and an adjacent outlet side).

Inlet section 122 may be located at a same end and on a same side of optical fiber heat exchanger 100 as inlet port 112 such that inlet section 122 aligns and interfaces with inlet port 112. Similarly, outlet section 124 may be located at a same end and on a same side of optical fiber heat exchanger 100 as outlet port 114 such that outlet section 124 aligns and interfaces with outlet port 114.

As further shown in FIG. 1, inner body 120 may include a plurality of guide walls 126 that extend along the length of inner body 120. Guide walls 126 may form a plurality of channels 128 extending along the length of inner body 120 between pairs of guide walls 126. The plurality of guide walls 126 may include one or more parallel straight guide walls 126a that extend parallel and straight along at least a portion of the length of inner body 120 from the end of inner body 120 at which inlet section 122 and outlet section 124 are located. The plurality of guide walls 126 may include one or more parallel straight guide walls 126b that extend parallel and straight along at least a portion of the length of inner body 120 from the end of inner body 120 opposing the end of inner body 120 at which inlet section 122 and outlet section 124 are located. The plurality of guide walls 126 may include one or more parallel straight guide walls 126c that extend parallel and straight along at least a portion of the length of inner body 120 and connect to one or more U-shaped guide walls 126d in a transition section 130 of inner body 120. Transition section 130 may be located at an end of inner body 120 opposing the end of inner body 120 at which inlet section 122 and outlet section 124 are located.

Parallel straight guide walls 126a, 126b, and 126c may be parallel to the length of inner body 120, and each parallel straight guide may be parallel to other parallel straight guide walls 126a, 126b, and 126c. Parallel straight guide walls 126a, 126b, and 126c may form one or more parallel straight inlet channels 128a through which cooling liquid flow-in from inlet section 122 occurs, and may form one or more parallel straight outlet channels 128b through which cooling liquid flow-out to outlet section 124 occurs. In some implementations, the quantity of parallel inlet channels 128a and the quantity of parallel outlet channels 128b may be the same quantity of channels or may be different quantities of channels.

Parallel straight inlet channels 128a and parallel straight outlet channels 128b may extend parallel and straight along at least a portion of the length of inner body 120. For example, parallel straight inlet channels 128a may be extend parallel and straight along and/or through an inlet portion of inner body 120. As another example, parallel straight outlet channels 128b may be extend parallel and straight along and/or through an outlet portion of inner body 120. In some implementations, the inlet portion (and thus, parallel straight inlet channels 128a) may be located on a same side of inner body 120 as inlet section 122 (e.g., an inlet side). In some implementations, the outlet portion (and thus, parallel straight outlet channels 128b) may be located on a same side of inner body 120 as outlet section 124 (e.g., an outlet side). In some implementations, the inlet side and the outlet side may be located on opposing sides of inner body 120.

The inlet portion and the outlet portion may be connected by transition section 130. In this case, parallel straight inlet channels 128a and parallel straight outlet channels 128b may be connected by one or more U-shaped channels 128c in transition section 130. U-shaped channels 128c may be formed between one or more U-shaped guide walls 126d and/or one or more parallel straight guide walls 126a, 126b, and/or 126c. U-shaped channels 128c may provide a cooling liquid transition between cooling liquid flow-in through parallel straight inlet channels 128a and cooling liquid flow-out through parallel straight outlet channels 128b. In some implementations, U-shaped guide walls 126d and U-shaped channels 128c may be other shapes and/or geometries, such as semi-circle shaped, semi-oval shaped, rounded, and/or other shapes that function to alter the direction of travel of cooling liquid through transition section 130 such that the flow of the cooling liquid may transition from parallel inlet channels 128a to parallel outlet channels 128b via transition section 130.

In some implementations, each parallel straight inlet channel 128a may be connected to a single parallel straight outlet channel 128b by a U-shaped channel 128c, such as where the quantity of parallel straight inlet channels 128a and the quantity of parallel straight outlet channels 128b are the same quantity of channels. In some implementations, a U-shaped channel 128c may connect a plurality of parallel straight inlet channels 128a to a single parallel straight outlet channel 128b, a U-shaped channel 128c may connect a single parallel straight inlet channel 128a to a plurality of parallel straight outlet channels 128b, and/or the like.

As shown in FIG. 2, inner body 120 may be inserted into outer body 110. In this case, outer body 110 may be slid over inner body 120 to assemble optical fiber heat exchanger 100. Outer body 110 and inner body 120 may be interference fit such that the inner wall of outer body 110 interfaces with the tops of guide walls 126 to enclose channels 128. The interference fit reduces or prevents cooling liquid crosstalk from channel 128 to channel 128 without the need for welding between any two channels 128, which decreases the complexity of manufacturing optical fiber heat exchanger 100. In some implementations, outer body 110 and inner body 120 may be welded together at each end of outer body 110 and inner body 120 (e.g., at the ends of outer body 110 and inner body 120 where guide walls 126 and channels 128 are not located).

FIG. 2 further illustrates the flow path of cooling liquid in optical fiber heat exchanger 100. As shown in FIG. 2, cooling liquid flows into optical fiber heat exchanger 100 through inlet port 112 in outer body 110 and to inlet section 122 in inner body 120. From inlet section 122, the cooling liquid is dispersed among parallel straight inlet channels 128a. The cooling liquid flows through parallel straight inlet channels 128a and is guided through the inlet portion of inner body 120 from inlet section 122 to transition section 130. The cooling liquid enters transition section 130 from parallel straight inlet channels 128a and flows through transition section 130 via U-shaped channels 128c. The cooling liquid exits transition section 130 by flowing out of U-shaped channels 128c and into parallel straight outlet channels 128b. The cooling liquid flows through parallel straight outlet channels 128b and is guided through the outlet portion of inner body 120 from transition section 130 to outlet section 124 in inner body 120. The cooling liquid is removed from outlet section 124 (and from optical fiber heat exchanger 100) through outlet port 114 in outer body 110.

As the cooling liquid traverses along the flow path illustrated in FIG. 2, heat from the optical fiber or optical cable inserted through aperture 132 is removed from the optical fiber or optical cable and exchanged to the cooling liquid. Thus, the temperature of the cooling liquid increases as the cooling liquid traverses along the flow path. Accordingly, at the end of the flow path, the heated cooling liquid is removed from optical fiber heat exchanger 100 and cooled (e.g., the heat is removed from the cooling liquid) so that the cooling liquid can be returned to optical fiber heat exchanger 100 via inlet port 112 for further cooling of the optical fiber or optical cable inserted through aperture 132.

The top-down view of inner body 120 shown in FIG. 3 illustrates a detailed view of inlet section 122, parallel straight inlet channels 128a, and transition section 130. As shown in FIG. 3, cooling liquid may flow into inlet section 122 and through parallel straight inlet channels 128a to transition section 130. As the cooling liquid flows though transition section 130, the cooling liquid flows along the curves and/or bends in U-shaped channels 128c. In this way, the cooling liquid in each U-shaped channel 128c remains isolated from other U-shaped channels 128c in transition section 130, which reduces and/or prevents cooling liquid mixing between U-shaped channels 128c in transition section 130. The isolation provided by U-shaped channel 128c in transition section 130 reduces the pressure drop between inlet section 122, outlet section 124, and transition section 130. Moreover, the isolation provided by U-shaped channel 128c in transition section 130 reduces cooling liquid turbulence in transition section 130.

As shown in the cross-sectional view in FIG. 4, inner body 120 may include an inner ring 134 that forms an inner aperture 132 through inner body 120 in which an optical fiber or optical cable may be inserted. The size and/or thickness of inner ring 134 may be designed based on an amount of desired heat exchange between the optical fiber or optical cable inserted in aperture 132 and the cooling liquid flowing through optical fiber heat exchanger 100, based on desired structure properties (e.g., a capability to withstand a particular amount of pressure in channels 128), based on the size of optical fiber or optical cable that is to be inserted in aperture 132, and/or the like.

As further shown in FIG. 4, guide walls 126 and channels 128 may be located around the circumference of inner ring 134, and may extend radially outward from inner ring 134 to the inner wall of outer body 110. In some implementations, the thickness of guide walls 126 may be the same from inner ring 134 to the inner wall of outer body 110 such that guide walls 126 are straight from inner ring 134 to the inner wall of outer body 110. In some implementations, the thickness of guide walls 126 may increase from inner ring 134 to the inner wall of outer body 110 such that guide walls 126 are outwardly flared. In some implementations, the thickness of guide walls 126 may decrease from inner ring 134 to the inner wall of outer body 110 such that guide walls 126 are inwardly flared. In some implementations, the height of guide walls 126 (and thus, the height of channels 128), the thickness of guide walls 126, and/or the width of channels 128 may be designed based on an amount of desired heat exchange between the optical fiber or optical cable inserted in aperture 132 and the cooling liquid flowing through optical fiber heat exchanger 100, based on the amount of cooling flow desired through channels 128, based on desired structure properties (e.g., a capability to withstand a particular amount of pressure in channels 128), based on the size of optical fiber or optical cable that is to be inserted in aperture 132, and/or the like As further shown in FIG. 4, in some implementations, optical fiber heat exchanger 100 may include gaps 136 (or bleed holes) between the top of guide walls 126 and the inner wall of outer body 110. Gaps 136 may provide a small amount of cooling liquid crosstalk between adjacent channels 128. The cooling liquid crosstalk provided by gaps 136 may be used to equalize pressures in adjacent channels 128 in the case that a blockage occurs in a channel 128, and may permit cooling liquid to flow into adjacent channels 128 around the blockage.

As indicated above, FIGS. 1-4 are provided merely as one or more examples. Other examples are contemplated and may differ from what is described with regard to FIGS. 1-4. For example, while FIGS. 1-4 illustrate optical fiber heat exchanger 100 including parallel straight guide walls 126a, 126b, and 126c, and parallel straight channels 128a and 128b, in some implementations, optical fiber heat exchanger 100 may include guide walls and channels of other shapes and/or geometries, such as spiral guide walls and channels (e.g., guide walls and channels that spiral or corkscrew radially along the length of optical fiber heat exchanger 100), square interleaved guide walls and channels, square step-down guide walls and channels, straight fin guide walls and channels, and/or the like.

The foregoing disclosure provides illustration and description, but is not intended to be exhaustive or to limit the implementations to the precise forms disclosed. Modifications and variations may be made in light of the above disclosure or may be acquired from practice of the implementations.

The number, arrangement, thicknesses, order, symmetry, and/or the like, of layers shown in the figures and/or described herein are provided as examples. In practice, emitter arrays and/or vertical-emitting devices shown in the figures and/or described herein may include additional layers, fewer layers, different layers, differently constructed layers, or differently arranged layers than those shown in the figures and/or described herein. Additionally, or alternatively, a set layers (e.g., one or more layers) of an emitter array and/or a vertical-emitting device may perform one or more functions described as being performed by another set of layers of the emitter array and/or the vertical-emitting device.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical fiber heat exchanger, comprising:
an outer body; and
an inner body inserted into the outer body, comprising:
a plurality of guide walls to guide a cooling liquid through the optical fiber heat exchanger to exchange heat from an optical fiber inserted in the optical fiber heat exchanger,
an inlet portion including a first set of parallel straight channels, formed by a first subset of the plurality of guide walls, that extend through the inlet portion,
a transition section including a set of U-shaped channels, formed by a second subset of the plurality of guide walls, that extend through the transition section, and
an outlet portion including a second set of parallel straight channels, formed by a third subset of the plurality of guide walls, that extend through the outlet portion.

2. The optical fiber heat exchanger of claim 1, wherein the cooling liquid flows from an inlet section of the inner body through the inlet portion in the first set of parallel straight channels;
wherein the cooling liquid flows from the inlet portion through the transition section in the set of U-shaped channels; and
wherein the cooling liquid flows from the transition section through the outlet portion in the second set of parallel straight channels and to an outlet section of the inner body.

3. The optical fiber heat exchanger of claim 1, wherein the first set of parallel straight channels and the second set of parallel straight channels are parallel to a length of the inner body; and
wherein the first set of parallel straight channels and the second set of parallel straight channels are located around a circumference of the inner body to cool the optical fiber extending in the optical fiber heat exchanger.

4. The optical fiber heat exchanger of claim 1, wherein a quantity of the first set of parallel straight channels and a quantity of the second set of parallel straight channels are different quantities.

5. An optical fiber heat exchanger, comprising:
an outer body; and
an inner body inserted into the outer body, comprising:
a plurality of guide walls that form a plurality of parallel straight channels, extending along a length of the inner body, to guide a cooling liquid through the optical fiber heat exchanger to exchange heat from an optical fiber inserted in the optical fiber heat exchanger,
wherein the plurality of parallel straight channels are parallel to the length of the inner body, and a transition section comprising a plurality of U-shaped channels to guide the cooling liquid through the transition section,
   wherein the plurality of U-shaped channels connect a first subset of the plurality of parallel straight channels and a second subset of the plurality of parallel straight channels.

6. The optical fiber heat exchanger of claim 5, wherein the inner body comprises:
an inlet section and an outlet section located at a first end of the inner body,
   wherein the transition section is located at a second end of the inner body opposing the first end.

7. The optical fiber heat exchanger of claim 5, wherein the first subset of the plurality of parallel straight channels is to guide the cooling liquid from an inlet section of the inner body, through an inlet portion of the inner body, and to the transition section; and
   wherein the second subset of the plurality of parallel straight channels is to guide the cooling liquid from the transition section, through an outlet portion of the inner body, and to an outlet section of the inner body.

8. The optical fiber heat exchanger of claim 7, wherein the inlet portion is located on a first side of the inner body; and
   wherein the outlet portion is located on a second side of the inner body opposite the first side.

9. The optical fiber heat exchanger of claim 5, wherein the plurality of guide walls comprises:
one or more first straight guide walls that extend from a first end of the inner body,
one or more second straight guide walls that extend from a second end of the inner body opposite the first end, and
one or more U-shaped guide walls.

10. The optical fiber heat exchanger of claim 5, wherein a thickness of the plurality of guide walls increases radially outward from an inner ring of the inner body.

11. The optical fiber heat exchanger of claim 5, wherein a thickness of the plurality of guide walls is a same thickness radially outward from an inner ring of the inner body.

12. The optical fiber heat exchanger of claim 5, wherein the inner body and the outer body are interference fit to reduce cooling liquid crosstalk across the plurality of parallel straight channels and to permit cooling liquid crosstalk across the plurality of parallel straight channels to equalize pressure across the plurality of parallel straight channels.

13. An optical fiber heat exchanger, comprising:
an outer body; and
an inner body, inserted into the outer body, comprising:
   a plurality of guide walls;
   a plurality of parallel straight channels, between the plurality of guide walls and extending parallel to a length of the inner body to guide a cooling liquid along the length of the inner body to exchange heat from an optical fiber inserted in the optical fiber heat exchanger; and
   a transition section comprising a plurality of transition channels to guide the cooling liquid through the transition section,
      wherein the plurality of transition channels connect a first subset of the plurality of parallel straight channels and a second subset of the plurality of parallel straight channels.

14. The optical fiber heat exchanger of claim 13, wherein the inner body further comprises:
an inner aperture having a ring shape for receiving the optical fiber,
   wherein the plurality of guide walls extend radially outward from a ring associated with the ring shape.

15. The optical fiber heat exchanger of claim 13, wherein the transition section is located at a first end of the inner body opposite a second end at which an inlet section and an outlet section of the inner body are located.

16. The optical fiber heat exchanger of claim 15, wherein the plurality of parallel straight channels comprises:
a first set of parallel straight channels to guide the cooling liquid through an inlet portion of the inner body between the inlet section and the transition section of the inner body; and
a second set of parallel straight channels to guide the cooling liquid through an outlet portion of the inner body between the transition section and the outlet section of the inner body.

17. The optical fiber heat exchanger of claim 16, wherein the inlet portion is located on a first side of the inner body; and
   wherein the outlet portion is located on a second side of the inner body opposite the first side.

18. The optical fiber heat exchanger of claim 13, wherein the plurality of transition channels comprise:
a plurality of U-shaped channels in the transition section.

19. The optical fiber heat exchanger of claim 18, wherein the first subset of the plurality of parallel straight channels and the second set of parallel channels are connected by the plurality of U-shaped channels in the transition section.

20. The optical fiber heat exchanger of claim 13, wherein the inner body and the outer body are interference fit to reduce cooling liquid crosstalk across the plurality of parallel straight channels and to permit cooling liquid crosstalk across the plurality of parallel straight channels to equalize pressure across the plurality of parallel straight channels.

* * * * *

UNITED STATES PATENT AND TRADEMARK OFFICE
CERTIFICATE OF CORRECTION

PATENT NO. : 10,962,727 B2
APPLICATION NO. : 16/688702
DATED : March 30, 2021
INVENTOR(S) : Yiduo Zhang et al.

It is certified that error appears in the above-identified patent and that said Letters Patent is hereby corrected as shown below:

In the Claims

Claim 19:
Column 10, Line 44, change "the second set of parallel channels are connected" to -- the second subset of the plurality of parallel straight channels are connected --

Signed and Sealed this
Twelfth Day of July, 2022

Katherine Kelly Vidal
*Director of the United States Patent and Trademark Office*